455/12

United Stat[es Patent]   7X 50634   X 5019 D

Sasaki et al.

[15] 3,641,274

[45] Feb. 8, 1972

[54] SYNCHRONIZATION SYSTEM FOR COMMUNICATION INFORMATION IN PCM TIME DIVISION MULTIPLE ACCESS COMMUNICATION SYSTEM

[72] Inventors: Hiroshi Sasaki, Chiba; Tatsuo Maruyama; Hisao Kanzaki, both of Tokyo; Yasuhiko Sakamoto, Kawasaki-shi, all of Japan

[73] Assignees: Kokusai Denshin Denwa Co., Ltd., Tokyo; Fujitsu Limited, Kawasaki, Japan

[22] Filed: Oct. 13, 1969

[21] Appl. No.: 865,922

[30] Foreign Application Priority Data

Oct. 11, 1968 Japan....................................43/74042

[52] U.S. Cl................................................179/15 BS, 325/4

[51] Int. Cl................................................H04j 3/06

[58] Field of Search.......................179/15 BY, 15 BA, 15 BS; 343/100 ST; 325/4

[56] References Cited

UNITED STATES PATENTS

| | | | |
|---|---|---|---|
| 3,566,267 | 2/1971 | Golding | 179/15 X BS |
| 3,532,985 | 10/1970 | Glomb | 179/15 X BS |

*Primary Examiner*—Ralph D. Blakeslee
*Attorney*—Curt M. Avery, Arthur E. Wilfond, Herbert L. Lerner and Daniel J. Tick

[57] ABSTRACT

A memory stores a unique word pattern and a predicted receiving time for each burst in a frame in a communication synchronization system of a time division multiple access communication system. A counter counts the timing of a frame. A coincidence detection circuit couples the counter to a receiving time circuit and determines coincidence between the count of the counter and the predicted receiving time stored in the memory and actuates the receiving time circuit when coincidence is detected. A unique word register stores the unique word pattern. A unique word detector having outputs and an input is coupled to the receiving time circuit via the unique word register and determines coincidence between the unique word pattern and the unique word pattern of a received burst. The unique word detector is initiated in operation by a signal from the receiving time circuit. A correcting circuit coupled to the outputs of the unique word detector determines a deviation between the time of reception of the burst and the predicted receiving time and corrects the predicted receiving time in accordance with the deviation.

7 Claims, 12 Drawing Figures

SYNCHRONIZATION SYSTEM FOR COMMUNICATION INFORMATION IN PCM TIME DIVISION MULTIPLE ACCESS COMMUNICATION SYSTEM

DESCRIPTION OF THE INVENTION

Our invention relates to a synchronization system in a communication network. More particularly, the invention relates to a synchronization system for communication information in a PCM time division multiple access communication system in which the transmission time between stations varies. In a satellite communication system, for example, the transmission of information between ground stations is completed via a satellite station. The satellite station orbits in space and the movement of said satellite station varies the transmission time between the ground stations of the earth. Consequently, if the timing of the transmission of information from each ground station to the satellite is not properly set, there is mutual interference of information at the satellite station and such information is made unintelligible. It is also necessary for each ground station to select the desired information from the trains of information stored at the satellite station, and such selection must be made at a time which is synchronous with the continuously varying transmission of information.

When a system of the aforedescribed type is utilized for a telephone exchange, errors or interferences in information result in erroneous connections, noise or crosstalk. In order to avoid such unfavorable results, greater accuracy is required.

The principal object of our invention is to provide a new and improved synchronization system in a communication network wherein the transmission time varies.

An object of the invention is to provide a synchronization system which provides extremely accurate transmission and reception of information in a communication system where the transmission time varies continuously.

An object of the invention is to provide a synchronization system for a communication system in which the transmission time varies, which synchronization system functions with accuracy, efficiency, effectiveness and reliability.

An object of the invention is to provide a synchronization system which accurately derives the desired information from the trains of information which have been transmitted.

An object of the invention is to provide a synchronization system which insures the transmission of specific information from ground stations without interference with other information at a satellite station.

There are generally two methods of synchronization, which are dependent synchronization, wherein a station refers to a reference station for synchronization, and mutual synchronization, where each station is mutually independent. Our invention is a dependent synchronization system.

In accordance with the present invention, a communication synchronization system of a time division multiple access communication system which transmits a plurality of bursts in each frame comprises a memory for storing a unique word pattern and a predicted receiving time for each burst in a frame. A counter counts the timing of a frame. A receiving time circuit provides timing signals. A coincidence detection circuit couples the counter to the receiving time circuit and determines coincidence between the count of the counter and the predicted receiving time stored in the memory and actuates the receiving time circuit when coincidence is detected. A unique word register stores the unique word pattern. A unique word detector having outputs and an input coupled to the receiving time circuit via the unique word register determines coincidence between the unique word pattern and the unique word pattern of a received burst. The unique word detector is initiated in operation by a signal from the receiving time circuit. A correcting circuit coupled to the outputs of the unique word detector determines a deviation between the time of reception of the burst and the predicted receiving time and corrects the predicted receiving time in accordance with the deviation.

The communication synchronization system of the time division multiple access communication system further comprises means coupled to the memory for reading out a unique word pattern stored in the memory and for shifting the read out unique word pattern at a constant rate. The unique word detector compares the unique word pattern with the unique word pattern of the received burst at each shift position of the last-mentioned means and produces a coincidence detection output at a coincident shift position. The correcting circuit determines the phase difference between the predicted receiving time and the time of reception of the burst by the shift position which produces the coincidence detection output.

The means for reading out a unique word pattern stored in the memory shifts the read out unique word pattern within an allowable receiving range for the predicted receiving time. The means for reading out a unique word pattern stored in the memory shifts the read out unique word pattern bit by bit. The unique word detector compares the unique word pattern with the unique word pattern of the received burst at each shift position of the last-mentioned means bit by bit and produces a coincidence detection output at a coincident shift position at which the number of coincidences between the bits exceeds a predetermined number.

The correcting circuit stores the corrected predicted receiving time in the same area of the memory which stores the initial predicted receiving time.

The communication synchronization system of the time division multiple access communication system further comprises a first storage for reading out from the memory the corrected predicted receiving time corrected with regard to a burst of a reference station of the communication system and storing the readout corrected predicted receiving time. A second storage reads out from the memory the corrected predicted receiving time corrected with regard to a burst of the station of the communication system having the storages and stores the read out corrected predicted receiving time. A calculating circuit connected to the first and second storages determines from the predicted receiving time the time difference between the burst of the reference station and the burst of the station having the storages. A third storage connected to the calculating circuit stores the time difference determined by the calculating circuit. The calculating circuit determines deviation of the transmission phase from the difference of the stored contents of the first and second storages and the stored contents of the third storage and corrects the transmission time of the burst of the station having the storages in accordance with the deviation.

The communication synchronization system of the time division multiple access communication system further comprises a satellite station in the communication system. A circuit determines the maximum round trip radio wave propagation time to the satellite station of the communication system. A circuit coupled to the calculating circuit and the last-mentioned circuit prevents the correction of the next transmission phase during the period between the completion of the correction of the transmission phase and the end of the maximum round trip radio wave propagation to the satellite station.

The communication synchronization system of the time division multiple access communication system further comprises a ring counter connected to the calculating circuit for counting the number of bits in a frame. The calculating circuit transmits the burst of the station having the ring counter whenever the ring counter counts a predetermined number and corrects the transmission phase when the deviation is a positive value by halting the count up of the ring counter by one bit and when the deviation is a negative value by repeating the count up by the ring counter of bits the number of which is greater by one than that of the normal frame bits for each frame until the deviation is eliminated.

In order that the present invention may be readily carried into effect, it will now be described with reference to the accompanying drawings, wherein.

Figure 1:
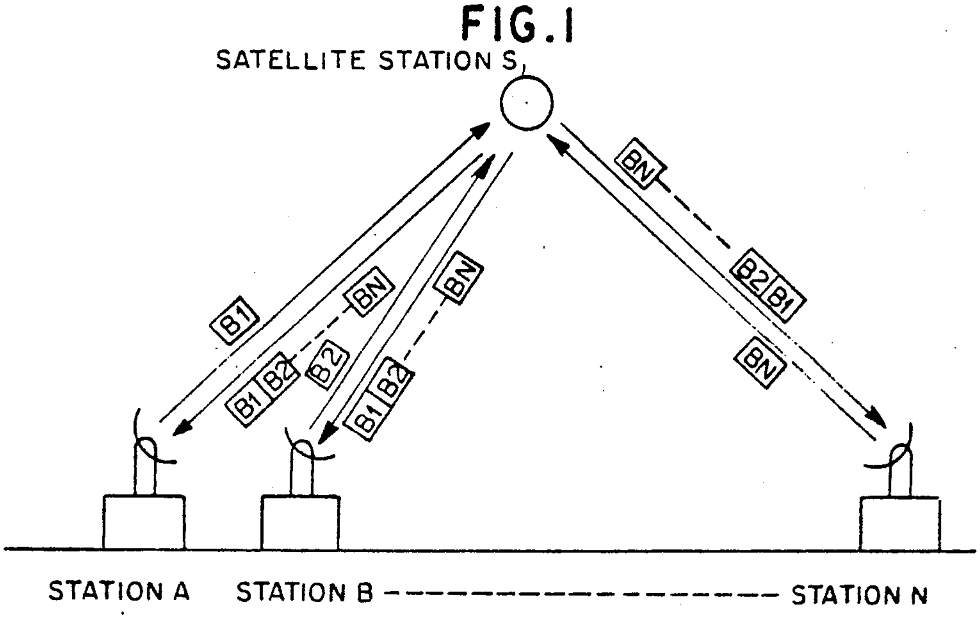
FIG. 1 is a schematic diagram of a satellite communication system.

The satellite communication system of FIG. 1 comprises a satellite station S, and N ground stations, A, B, . . . N. As shown in FIG. 1, each ground station transmits, in the time slot allotted thereto, bursts B1, B2, . . . BN. Each burst transmitted from the ground stations is relayed at the communication satellite S and all bursts are received at each ground station.

Figure 2:
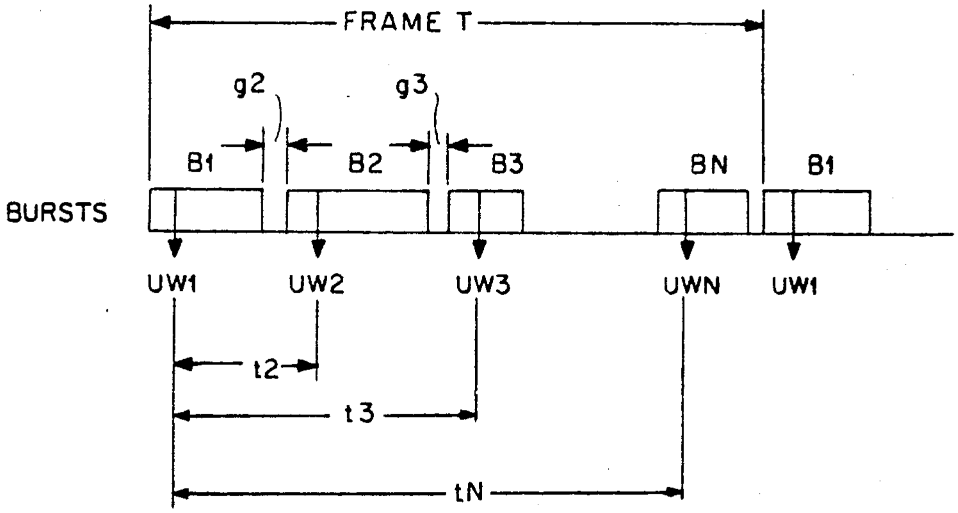
FIG. 2 is a graphical presentation illustrating reception in a time division multiple access system.

FIG. 2 illustrates a train of bursts suitably positioned on the satellite S. The bursts are transmitted from the ground station A at a time B1 and from the ground station N at a time BN, so that they do not interfere or overlap at the communication satellite S. In FIG. 2, a repetition period T samples communication information and is known as the frame. The frame is comprised of 6250 bits. Trains of information B1, B2, . . . BN are transmitted by N ground stations of the communication system. The trains of information are known as bursts.

Each burst comprises line information and control information. The receiving timing of each burst is determined upon the completion of the reception of a unique word which comprises part of the control information. Times UW1, UW2, . . . UWN indicate that the various bursts have been received. Due to phase differences between the various clocks of the N ground stations, or, in a satellite communication system, due to phase variation resulting from different distances between a transmitting station and a receiving station, caused by movement of the satellite, the invention detection timing may shift by one or more bits.

Furthermore $t_i$ represents the phase difference between the burst $B_1$ of the standard station and the burst $B_i$ and control is effected so that a phase difference of $t_i$ may be always maintained between the standard burst $B_1$ and $B_i$. However the phase difference is slightly varied due to the movement of the satellite and a shift in frequency of the oscillators of the transmitting stations. Also $g$ represents the guard time for preventing collision of adjacent bursts and is equal a multiple of the maximum variation of the burst.

Our invention relates to a communication system wherein the time for the reception of information varies, as hereinbefore described, the proper reception of information in accordance with the magnitude of variation. Our invention also relates to the correction of the transmission time at each of the stations in order to avoid disorder or interference of transmitted information due to overlapping or interference of adjacent bursts caused by the variation in timing. Each ground station has a memory which stores predicted times for receiving each burst in a frame. The predicted receiving times indicate the instant for receiving each burst, and each burst is received in accordance with such indication. The predicted receiving times are, however, required to be rewritten, periodically, in order to follow the magnitude of variation due to the variation of the receiving times.

The rewriting of the predicted receiving times is undertaken by first determining the phase deviation from the predicted receiving times and the actual burst receiving times. The previous predicted receiving times are amended by the magnitude of the phase deviation. The modified times are restored in the memory and indicate the next predicted receiving times. The predicted receiving times thus always follow the variation and the times for receiving bursts are measured from such receiving times, so that the information may be properly received. The foregoing method is explained with reference to FIG. 3.

Figure 3:
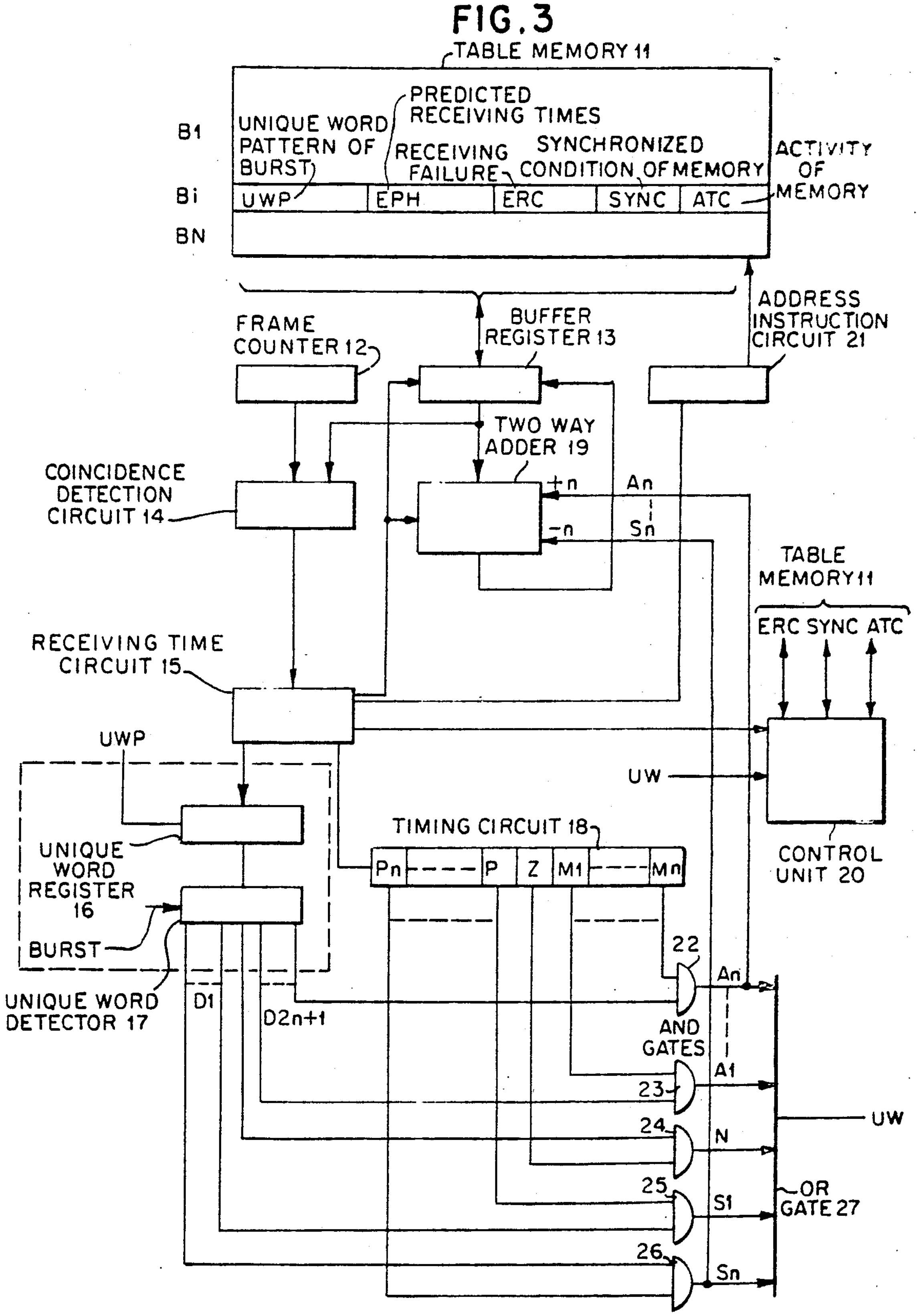
FIG. 3 is a block diagram of an embodiment of the receiving control part of the synchronization system of the invention.

In FIG. 3, a table memory 11 stores various conditions concerning each burst. A buffer register 13 reads and writes the predicted receiving time table EPH which is stored in the table memory 11. A frame counter 12 counts the frame frequency for determining the phase in the frame and is counted upward by a 50 megahertz clock. A coincidence detection circuit 14 determines the coincidence of the stored contents of the table memory 11, readout to the buffer register 13, with the contents of the frame counter 12. A receiving time circuit 15 actuates various circuits at appropriate times.

A unique word register 16 comprises a shift register to which the unique word pattern of each burst is supplied from the table memory 11. A unique word detector 17 indicates the burst receiving time by comparative detection of the unique word pattern in the unique word register 16 and the pattern of the received signal. A timing circuit 18 detects the unique word stored in the shift register 16. A two way adder 19 is connected between an input and an output of the buffer register 13. A control unit 20 provides various synchronous controls. An address instruction circuit 21 is connected between the receiving time circuit 15 and an input to the table memory 11 and functions to provide the instructions for said table memory. Each of a plurality of AND-gates 22 to 26 has one input connected to a corresponding output of the timing circuit 18 and another input connected to a corresponding output of the unique word detector 17. An OR-gate 27 has a plurality of inputs, each of which is connected to a corresponding output of the AND-gates 22 to 26.

The table memory 11 comprises a storage part UWP for the unique word pattern for each burst, a storage part EPH for the predicted receiving times, a storage part ERC for the number of times when there is a failure in receiving, a part SYNC indicating whether the memory is synchronized, and a part ATC indicating whether the memory is taking part in the transmission and reception of information. The part SYNC is constituted by two bits, and 00 indicates the state in which a burst is being searched, 01 indicates the state in which it is confirmed that the caught burst is the proper burst, and 10 indicates the state in which synchronism is stable. The monitoring of the receiving synchronization of a burst Bi is explained as follows. The predicted receiving time from the storage part EPH of the table memory 11 is read out to the buffer register 13. The predicted time is previously recorded as the number of bits converted from the predicted time which elapses from the beginning of the frame synchronization to the completion of reception of the unique word part UWi concerning the burst Bi.

The frame counter 12 counts 6250 bits for each frame of 125 microseconds determined in accordance with the sampling theorem for audio frequency pulse code modulation, at 0–4 kilohertz. The coincidence detection circuit 14 determines whether or not there is coincidence between the predicted time, as indicated by the frame counter 12 and the contents of the buffer register 13. If there is coincidence, the coincidence detection circuit 14 transfers a coincidence output signal to the receiving time circuit 15. The receiving time circuit 15 actuates the initiation of the shift of the unique word register 16 and the initiation of the shift of the timing circuit 18.

The unique word pattern UWP, which was read out at the same time that the predicted receiving time EPH was read out by the buffer register 13, has already been stored in the unique word register 16. The unique word pattern UWP is the pattern peculiar to each burst and functions to provide identity for each burst, the correction of error due to interference and allowance for error due to deviation of received time. The unique word pattern UWP presently comprises 20 bits.

A starting signal UDS from the receiving time circuit 15 causes the unique word pattern in the unique word register 16 to commence shifting bit by bit, and the unique word detector 17 determines the coincidence of the unique word with the unique word from the received burst. As a result, a signal provided in one of the output lines of the unique word detector 17 indicates the receiving time. The unique word detector 17 has a plurality of output lines D1 to D2$n$+1 each of which is connected to an input of a corresponding one of the AND-gates 22 to 26.

The timing circuit 18 comprises a 2$n$+1 bit shift register which functions to produce the output signal which appears sequentially in stages P$n$ . . . P1, Z, M1 . . . M$n$ when the unique word is shifted $\pm n$ bits relative to the predicted time, that is, when there is a receiving tolerance of $\pm n$ in the predicted receiving time. Each of the stages of the timing circuit 18 has an output line which is connected to another input of a corresponding one of the AND-gates 22 to 26. The timing circuit 18 is initiated in operation by the signal produced by the receiving time circuit 15 which determines the instant that the output signal of the unique word detector 17 is provided.

The Z-stage of the timing circuit 18 represents the predicted time. The stage P1 of the timing circuit 18 indicates that the received time is 1 to $n$ bits earlier than predicted. The stage M1 of the timing circuit 18 indicates that the received time is 1 to $n$ bits later than the predicted time. The earlier bits may be indicated as P$i$ and the later bits may be indicated as M$j$, wherein each of $i$ and $j$ is to $n$. The signals in the output lines D1 to D2$n$+1 of the unique word detector 17 and the signals in the output lines of the stages P1 . . . P$n$, Z, M1 . . . M$n$ of the timing circuit 18 function to switch one of the AND-gates 22 to 26 to its conductive condition thereby providing a bit +1 in the corresponding one of the output lines A$n$ . . . A1, N, S1 . . . SN. The bit +1 changes the condition of the output line UW to 1.

When the signal of the output line UW becomes 1, the two way adder or add-subtract circuit 19 initiates, in order to adjust the predicted receiving time table for the next frame, the buffer register 13 into adding +$i$ in its memory, when an AND-gate corresponding to an output line A$i$ is in its conductive condition. The output signal in the output line UW takes no action when the AND-gate corresponding to the output line N is in its conductive condition. The output signal in the output line UW causes the add-subtract circuit 19 to initiate the buffer register 13 to add −$j$ when the AND gate corresponding to an output line S$j$ is in its conductive condition. The adjusted values are thus stored as the next predicted receiving time table EPH and replace the present predicted receiving time table. Upon completion of the process the receiving time circuit 15 advances the address instruction circuit 21 one step and reads out the next information relating to the incoming burst B$i$+1 from the table memory 11. Since the cycles are continuous, each frame is corrected for the deviation to the proper predicted receiving time of each burst to utilize the information for the following frame. This results in proper constant tracking of receiving times, regardless of received fluctuating bursts.

In addition to the modification of the frame, the control unit 20 functions to provide proper modification of the timing by checking the output signals of the unique word detector 17. If the output signal from the receiving time circuit 15 indicates to the control unit 20 that the output from the unique word detector 17 has been actuated via said receiving time circuit, this indicates that the bursts are synchronized within the receiving tolerance. If the output signal from the unique word detector 17 has not been actuated via the receiving time circuit 15, it indicates that the bursts have not been properly synchronized. In the case of actuation via the receiving time circuit 15, the control unit 20 clears the receiving failure ERC part of the table memory 11. In the case of nonactuation via the receiving time circuit 15, the number of the failure is stored by recording the number and adding 1 to the receiving failure ERC part of the table memory 11 each time a failure occurs.

When a number greater than a specific value is counted, the control unit 20 shifts the system to the synchronization mode in order to properly synchronize the bursts, and 00 is written in the synchronized memory condition SYNC part of the memory table 11 to indicate such information. When the bursts are easily synchronized, the synchronized memory condition SYNC part of the memory table 11 writes the information as 10. This process is applicable only when the memory activity ATC part of the table memory 11 stores a 1 which indicates that the concerned burst was involved in the reception of the information. When the memory activity ATC part of the table memory 11 stores a 0, indicating that the burst was not involved in the reception of the information, the control unit 20 causes the receiving time circuit 15 to read out the information concerning the following burst via the address instruction circuit 21. The aforedescribed process is then completed.

Figure 4:
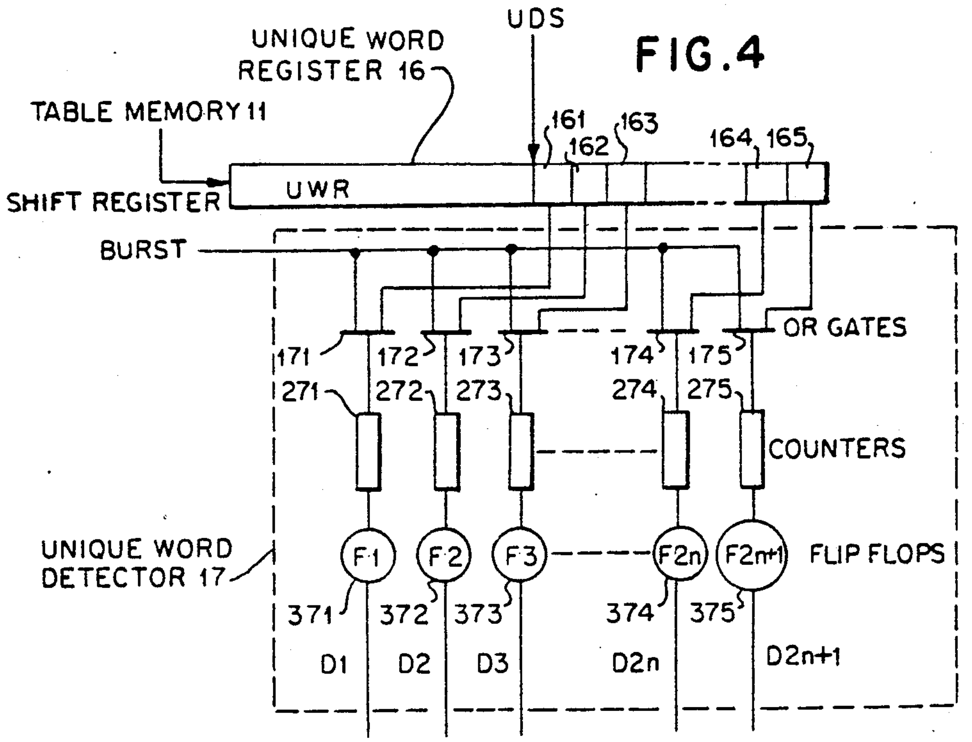
FIG. 4 is a block diagram of part of the receiving control part of FIG. 3.

FIG. 4 illustrates the unique word register 16 and the unique detector 17. The circuit of FIG. 4 assists in explaining the determination of the time when the receiving of the unique word part of the burst is completed and the transmission of the corresponding output signal in the output line D1 to D2$n$+1. The memory UWR of the unique word register 16 stores the unique word pattern of 20 bits which was previously stored in the table memory 11 (FIG. 3). The stages 161 to 165 of the unique word register 16 comprise 2$n$+1 bits and the pattern stored in said unique word register is shifted. The shifting of the pattern in the unique word register 16 is actuated by the signal UDS provided by the receiving time circuit 15 (FIG. 3).

The unique word detector 17 comprises a plurality of OR-gates 171 to 175. There are 2$n$+1 OR-gates 171 to 175. The OR-gates 171 to 175 correspond to the stages 161 to 165 of the unique word register 16. The corresponding bits are supplied to one part of the input and the unique word pattern of the received burst is supplied to the other part of the input. A plurality of counters 271 to 275 are connected to the OR-gates 171 to 175. When the counters 271 to 275 overflow, a 1 is provided at the output of the corresponding one of a plurality of flip flops 371 to 375 connected to the counters 271 to 275.

The unique word pattern utilized is that expressed in a binary number of 20 bits and the speed of shifting the unique word register is the same as the speed at which the unique word pattern is transmitted each time that the unique word register is shifted. The actuation provided by the receiving time circuit 15 is therefore provided by the output signal of the coincidence detection circuit 14 (FIG. 3), which signal has been supplied from the predicted receiving time table EPH of the table memory 11. Thus, the head of the burst is received when the head of the pattern of the unique word register is shifted to the middle of the bits of the stages 161 to 165 of the unique word register 16, that is, to the $n+1^{th}$ bit position.

Since each bit of the stages 161 to 165 of the unique word register 16 corresponds to each output line D1 to D2$n$+1 of the unique word detector 17, it is possible to determine the time lag by checking how far the unique word pattern is shifted in position when receiving the head of the burst and by transmitting a signal to the output of said detector in correspondence with said shift position. When a burst is received, the head bit is supplied to all of the OR-gates 171 to 175. In each of the OR-gates 171 to 175, another input provided from each corresponding bit in the unique word register 16 is joined with that of the head bit to produce a resultant output of the corresponding OR-gate. The second bit of the burst is processed together with the bits of the register in the same manner as the preceding case, except for those bits of the unique word pattern which have been moved one bit to the right by the shift register. This process is repeated for each of the bits of the burst until the unique word pattern completely passes through the register.

Simultaneously, each logic value 0 thus provided, which value indicates that two inputs to the logic circuit of the unique word detector 17 have the same digit value of 0 to 1, is counted each time the value 0 is supplied to a corresponding one of the counters 271 to 275. Each OR-gate 171 to 175 is connected to a corresponding one of the counters 271 to 275 and provides its corresponding counter with the number of coincidences for each bit of each stage 161 to 165 of the unique word register 16. Each counter counts the number of coincidences supplied thereto. In other words, two corresponding unique word patterns, one of which has been stored in the table memory 11 (FIG. 3) and the other of which is in the received burst, are compared with each other to determine whether the received pattern compares with the pattern of the register. That is, when the head of a burst is received, the pattern of the register positioned at that time is combined with the pattern of the burst completely in parallel. The patterns are supplied in parallel to the logic circuits of the unique word detector 17 to count the number of coincidences provided at each corresponding output. When the pattern of the burst is displaced or shifted by one bit and the number of coincidences is also counted at the output, at the second subsequent position of the register, the cycle is repeated at the third, fourth, and so on, positions until the pattern of the register completely passes through. During these cycles, the number of the coincidences becomes few, because the patterns comprise binary digits or combinations of 1 and 0.

Although the unique word pattern in the first position is primarily coincident with the unique word pattern of the burst in each corresponding component bit, usually counting 20, the coincidence in the other positions only counts, for example, 11, or 3, or the like. This means that the counter, which indicates 20, must be associated with the time of reception of the head of the burst sought if external disturbances during transmission, or signal error, may be disregarded. Taking this into consideration, it is determined that the counter which indicates more than 18 is the one which indicates the receiving time of the head of the burst. The output of a counter indicating more than 18 thus overflows and provides an overflow signal which is supplied to the corresponding flip-flop 371 to 375, which flip-flop produces the signal. The signal is provided at the output of the unique word detector 17 to indicate the receiving time of the concerned burst. Since only one of the outputs D1 to D2$n$+1 provides the signal, the receiving time may be synchronized by following the synchronization of the corresponding bit of the unique word register 16.

The contents of the unique word register 16, the counters 271 to 275 and the flip-flops 371 to 375 are cleared by the receiving time circuit 15 (FIG. 3), which initiates such clearing via circuitry not illustrated in the FIGS.

It is desirable to position each burst in the designated interval, as shown in FIG. 2. The intervals are subject to variation due to movement of the satellite, however. This often results in overlapping or interference of transmitted information and confusion ensues. In accordance with our invention, the designated values in the train of information are maintained, although the satellite moves irregularly. In order to achieve this, the reception time difference between the burst of the reference station and the burst of the concerned station is determined from the frame presently received. The result is compared with the time difference anticipated as a result of calculations from the designated time interval between the burst of the reference station and the burst of the concerned station, to determine the time slot to be corrected in the transmission of the subsequent burst.

Figure 5:
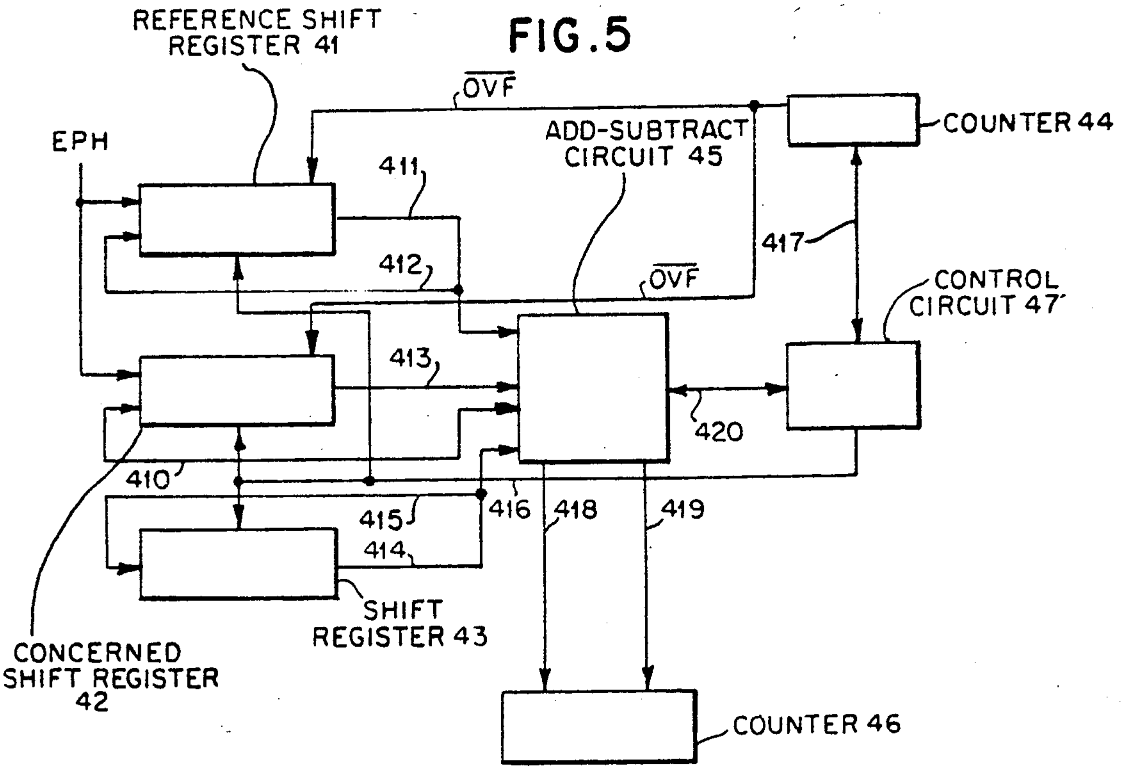
FIG. 5 is a block diagram of an embodiment of the transmitting control part of the synchronization system of the invention.

In the circuit of FIG. 5, the time interval between the two received bursts is determined by utilizing the predicted receiving times EPH of the table memory 11 (FIG. 3). Phase correction of the transmission timing is thereby provided. In FIG. 5, a reference shift register 41 for the reference station receiving phase contains the contents of the predicted receiving time table EPH of the table memory 11 (FIG. 3) with regard to the reference station. A concerned shift register 42 for the receiving phase of the concerned station contains the same information for the concerned station, as the reference shift register does for the reference station. A shift register 43 for the reference phase stores the time interval between two bursts of the reference station and the concerned station, calculated from the designated time interval.

A counter 44 counts the maximum distance required for a round trip to the satellite. An add-subtract circuit 45 provides serial calculations. A counter 46 counts the transmission phases of 6,250 per frame and functions to transmit the burst of the concerned station whenever a specific number of phases is counted. A control circuit 47 assigns individual information to each of the registers 41, 42 and 43.

The circuit of FIG. 5 functions to determine whether the burst of the concerned station is positioned in its proper time slot. The reference shift register 41, under the control of the control circuit 47, writes in the contents of the predicted receiving time table EPH of the table memory 11 relating to the reference station such as, for example, B1. The concerned shift register 42 similarly writes the contents of the predicted receiving time EPH of the table memory 11 relating to the concerned station. The shift register 43 writes in the information of the designated calculated time interval indicated by the number of bits.

The contents of the shift registers 41, 42 and 43 thus set are transferred bit by bit to the add-subtract circuit 45 via the corresponding lines 411, 413 and 414. The add-subtract circuit 45 performs a calculation in accordance with the equation:

$$\Delta PH=(43)-[(42)-(41)]$$

wherein ΔPH indicates the phase to be corrected, 41 indicates the contents of the reference shift register 41, 42 indicates the contents of the concerned shift register 42 and 43 indicates the contents of the shift register 43.

If the calculated result is 0, so that $\Delta PH=0$, this indicates that the related burst is properly positioned in the designated time slot. In this case, no corrective action is taken. When the calculated result is greater than 0, so that $\Delta PH>0$, this indicates that the burst is positioned earlier than in the designated time slot. In this case, the control circuit 47 produces a signal which is supplied via the output AD of the add-subtract circuit 45 to the ring counter 46, causing said ring counter to hold its count by one bit. At the same time, the control circuit 47 instructs the add-subtract circuit 45 to add 1 to the contents of the concerned shift register 42 and the result is returned to said register when the reference shift register 41 and the shift register 43 write in the same contents via lines 412 and 415 while the contents are being transferred to the add-subtract circuit 45 via the lines 411 and 414.

Thus, when all the information is transferred to the add-subtract circuit 45, the shift registers 41 and 43 write in exactly the same information. The timing of the shift of the shift register 41, 42 and 43 is provided by the control circuit 47 via a line 416. These processes are executed within the period of one frame and are repeated in each of the following frames until the calculation results in 0, wherein $\Delta PH=0$.

When the result of the calculation, in accordance with the equation, is less than 0, so that $\Delta PH<0$, this indicates that the concerned burst is positioned later than in the designated time slot. The control circuit 47 produces an output signal which is provided at the output SB of the add-subtract circuit 45 and is supplied to the counter 46. The counter 46 counts one additional bit. At the same time, −1 is added to the contents of the concerned shift register 42. This process is repeated for each subsequent frame until the result of the equation is 0, that is, $\Delta PH=0$.

When the calculated equation results in the desired result of $\Delta PH=0$, and corrective action is taken for each frame, the control circuit 47 actuates the counter 44 to calculate the greatest distance to the satellite. During this calculation, a prohibition signal is provided in the line 47 and prevents corrective action for the phase. If the counter 44 overflows, however, it produces a signal which instructs the control circuit 47 to initiate corrective action of the aforedescribed type.

Care must be taken not to produce a prohibition signal until the burst completes its round trip to the satellite. If such a prohibition signal were provided at the wrong time, it might be harmful since it may cause oscillations. More particularly, it may be assumed that a burst having phase deviation in a condition of, for example, $\Delta PH>0$, is received before the properly corrected burst is received and the next burst is transmitted with the deviation corrected, not in accordance with the deviation of the correctly modified burst. If such transmission is repeated, the deviation will accumulate continuously until it reaches an oscillation condition and the burst will overlap or interfere with the others. This results not only in the possible disturbance of the transmitted information, but also causes the related burst to be lost in the confusion.

Each of the blocks of each of FIGS. 3, 4 and 5 comprises any suitable circuit for performing the functions ascribed to it.

FIGS. 6, 7, 8, 9, 10, 11 and 12 show the details of the embodiments of FIGS. 3 and 5.

Figure 6:
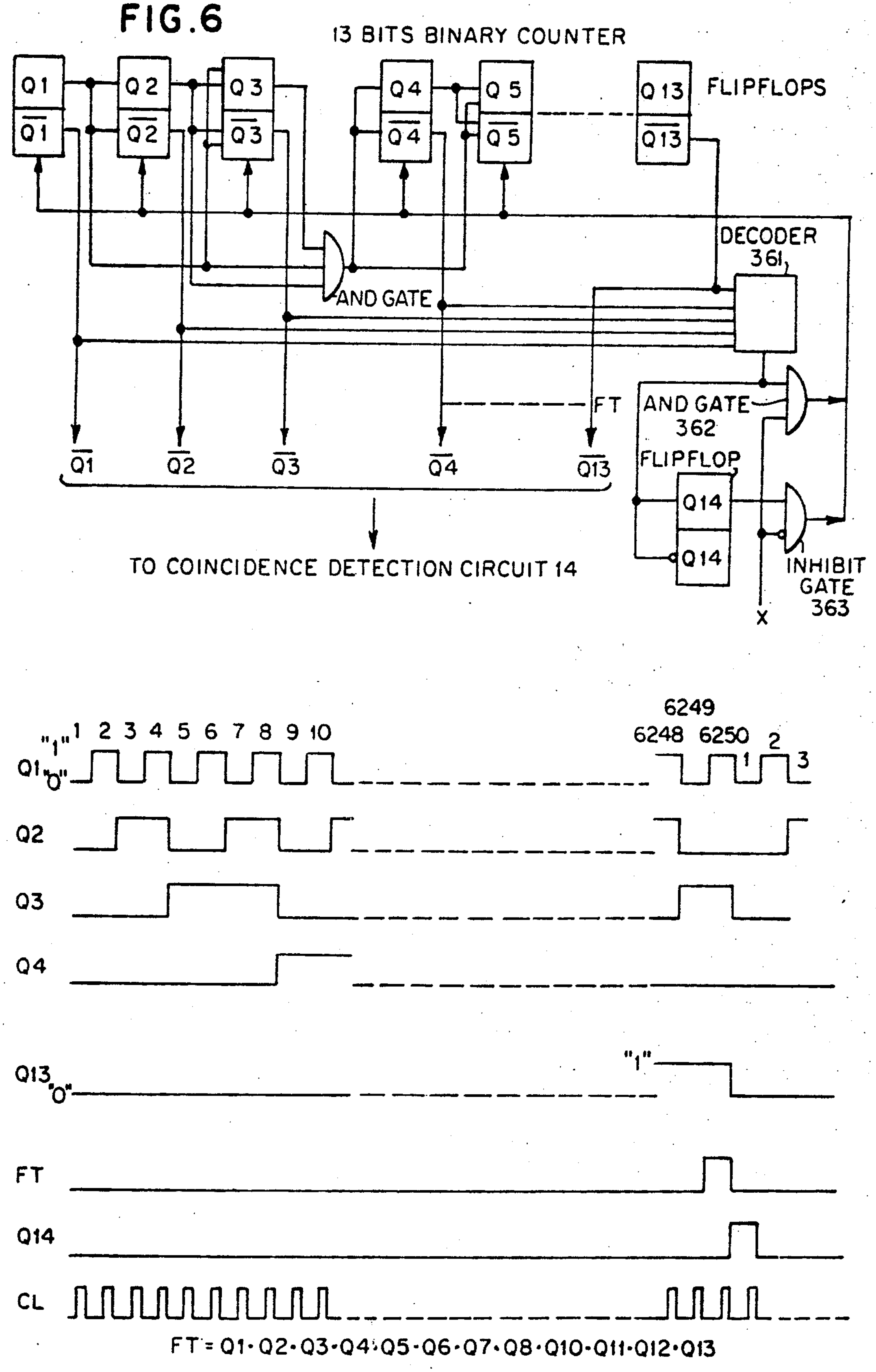
FIGS. 6, 7, 8, 9 and 10 are circuit diagrams illustrating the details of the embodiment of FIG. 3.

FIG. 6 shows the details of the frame counter 12 (FIG. 3), which comprises a binary counter of 13 bits. In FIG. 6, a decoder 361 extracts a counter value 6249. Also X is the signal which becomes "1" in the state in which standard burst $B_1$ is searched.

Figure 7:
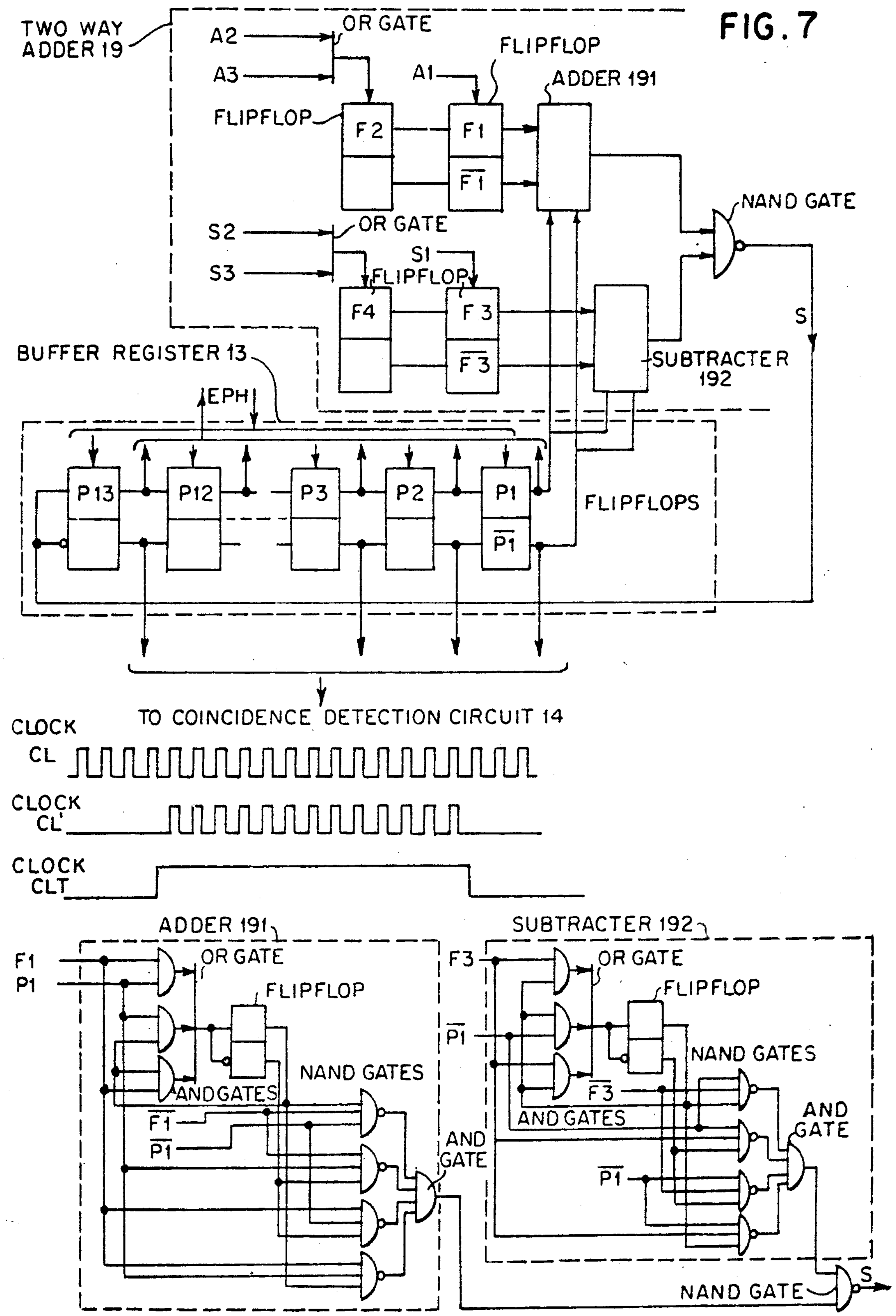

FIG. 7 shows the details of the buffer register 13 (FIG. 3) and the two way adder or adding and subtracting circuit 19 (FIG. 3). Also CL are infinitely continuing clock signals and CL' are clock signals extracted from the signals CL by a clock control signal CLT supplied from the receiving time circuit 15 (FIG. 3) and supplied to P1, P2, P3, . . . P12, P13, F1, F2, F3, F4.

Figure 8:
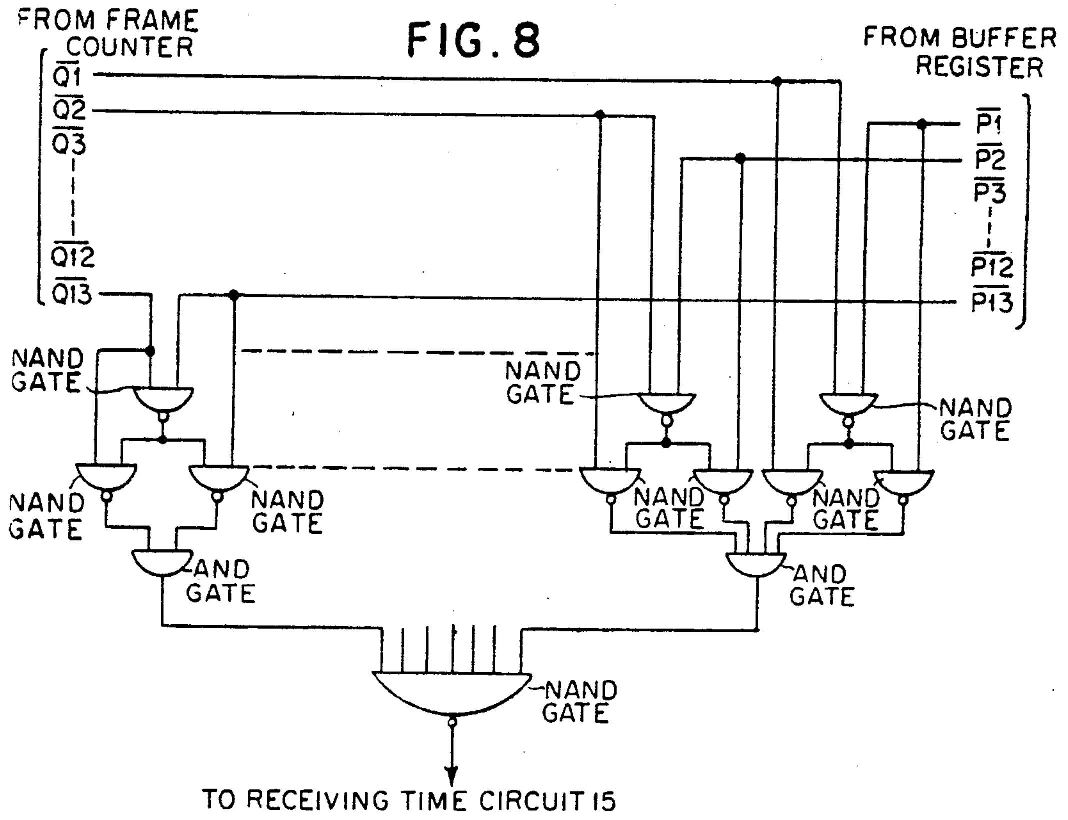
Figure 9:
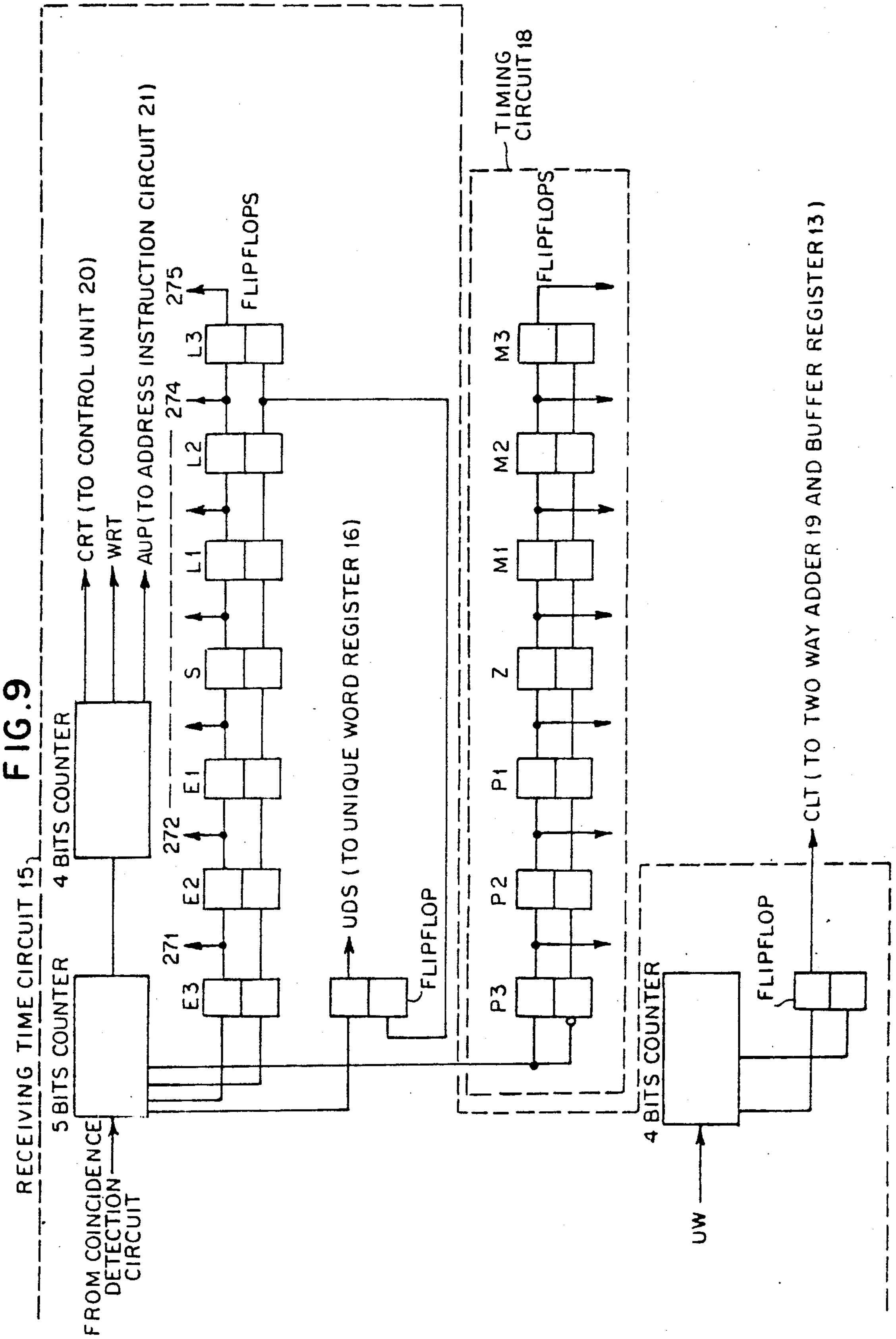

FIG. 8 shows the details of the coincidence detection circuit 14 (FIG. 3). FIG. 9 shows the details of the receiving time circuit 15 and the timing circuit 18 (FIG. 3), and in this case, the UW detecting scope in the unique word detector 17 ranges over the center of the forecast, 3 bits preceding the center and 3 bits succeeding the center.

In FIG. 9, UDS is a timing signal for controlling the shift of the unique word register. E3, E2, E1, S, L1, L2, L3 are timing signals for regulating the operating time of the counters 271 to 275 (FIG. 4) for counting the number of coincidence bits of the unique word relating to the phase earlier than the forecast phase by 3 bits. CCT is the signal for regulating the operating time for correcting the forecast phase shown in FIG. 7. CRT is the start signal of the control unit or receiving synchronism control circuit 20 (FIG. 3). AUP is the signal for starting the stepping of the address counter of the address instruction circuit 21 (FIG. 3) WRT is the timing signal for controlling the timing of writing of informations into the table memory 11.

Figure 10:
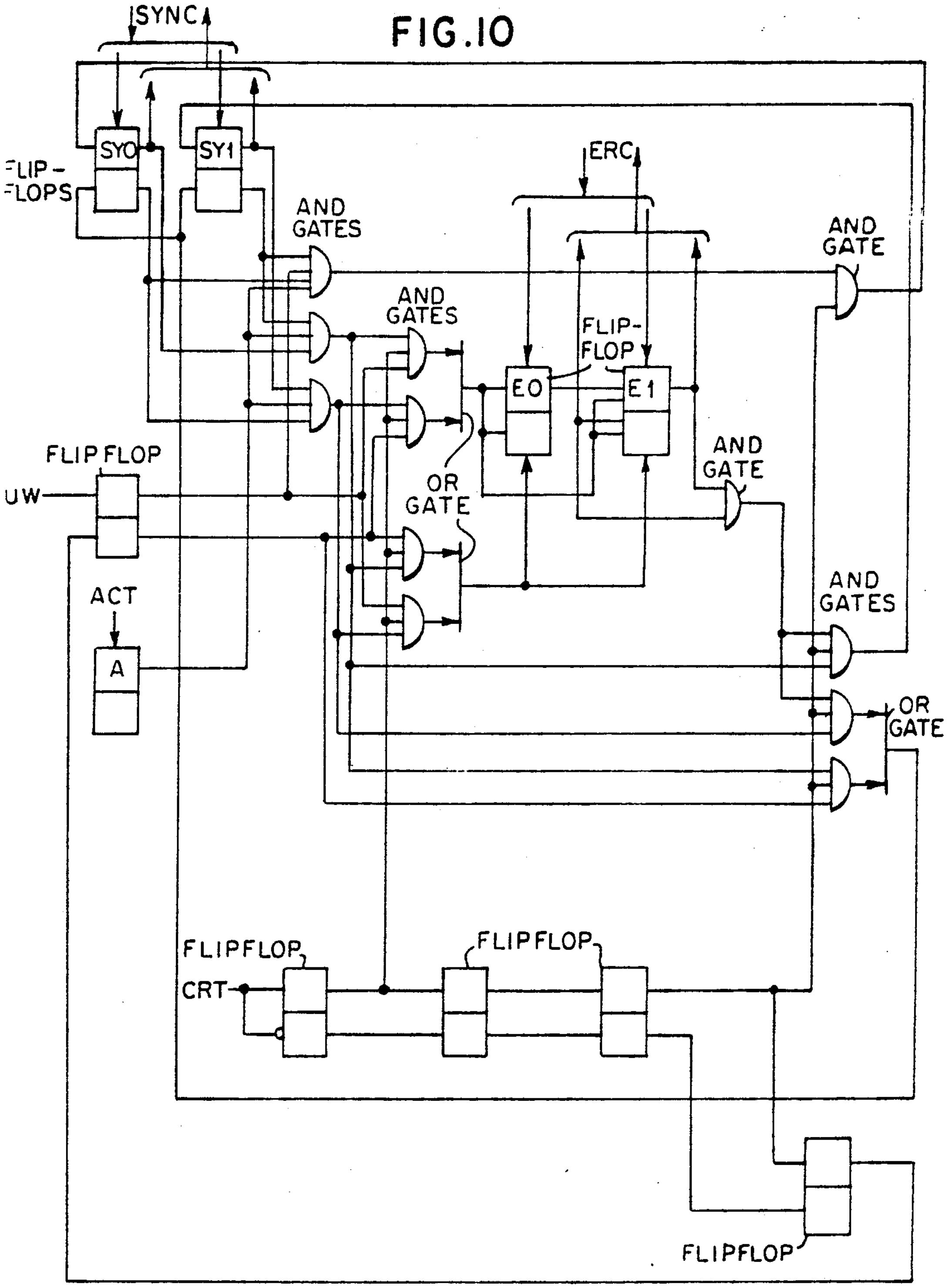

FIG. 10 shows details of the control unit or receiving synchronism control unit 20 (FIG. 3). CRT is the start signal from the receiving time circuit 15. In this case, it is confirmed that the UW scope is detected and synchronism is stable, or that the UW scope is not detected and there is a step out when 3 is counted by the ERC part. Details of the table memory 11 (FIG. 3) and the address instruction circuit 21 (FIG. 3) are not shown herein since these are very well known circuits. The table memory 11 comprises an IC memory as the high speed memory.

Figure 11:
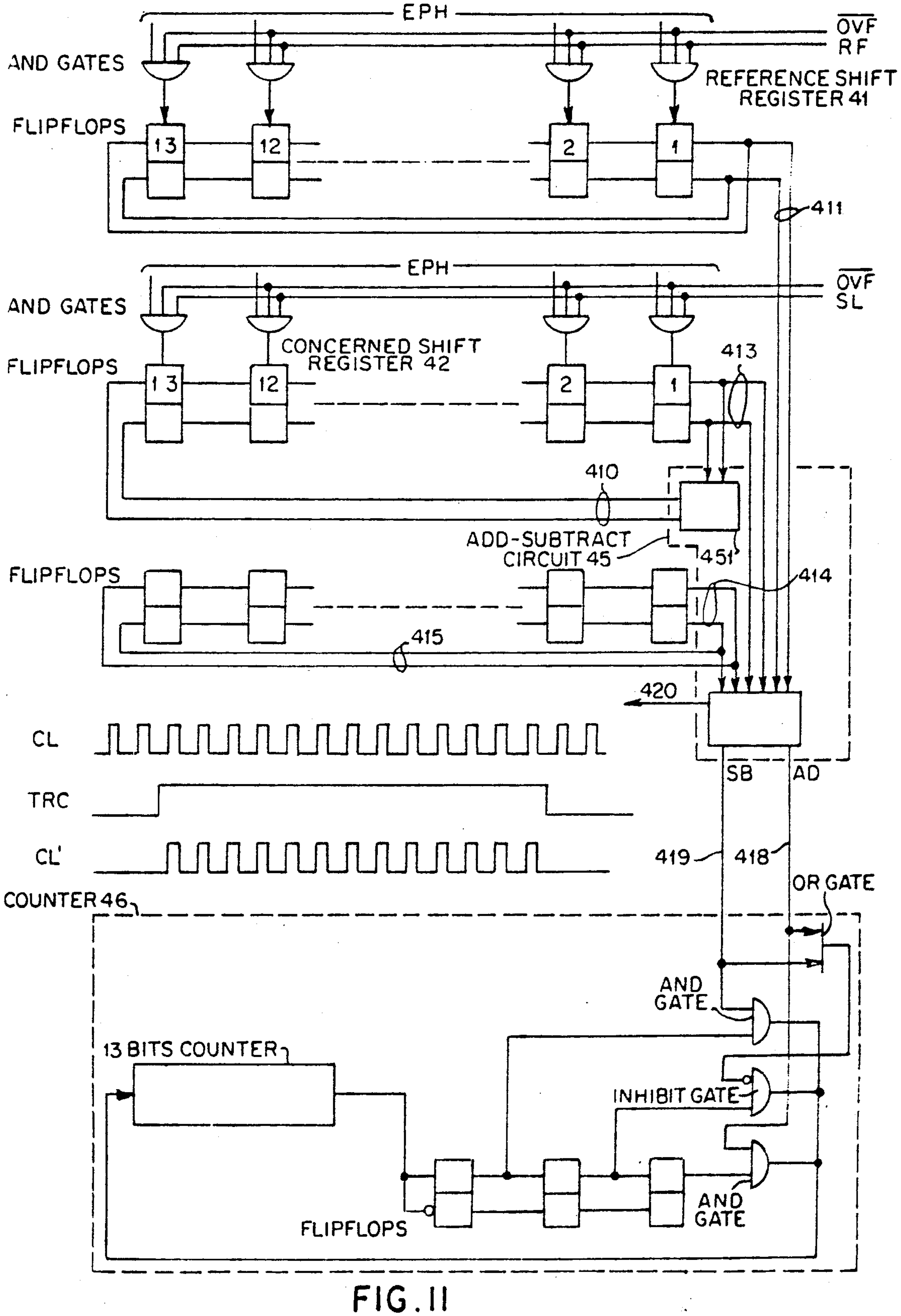

FIG. 11 shows the details of the reference shift register 41, the concerned shift register 42, the shift register 43, the add-subtract circuit 45, and the counter 46 (FIG. 5). A circuit 451 subtracts 1 from the concerned shift register and a circuit 452 counts the deviation of the receiving phase difference, that is, the amount of correction of the transmitting phase ΔPH. Details of these circuits are not shown herein, since they are modifications of the adder 191 and the subtracter 192 of FIG. 7. Details of a 13-bit counter in the transmitting frame phase counter are not shown since said counter is similar to the 13 bit counter of FIG. 6 in principle. The signal RF becomes "1" in the operation of supervising the synchronism of the burst of the reference station supplied from the address instruction circuit 21, and the signal which SL becomes "1" in the operation of supervising the synchronism of the first of specific stations. The timing signal TRC is supplied from the control circuit 47 (FIG. 5), and this timing signal extracts the clock signal CL' from the infinitely continuously supplied clock signals CL. The clock signal CL' is supplied to the reference shift resister 41, the concerned shift register 42 and the shift register 43 to shift said registers.

Figure 12:
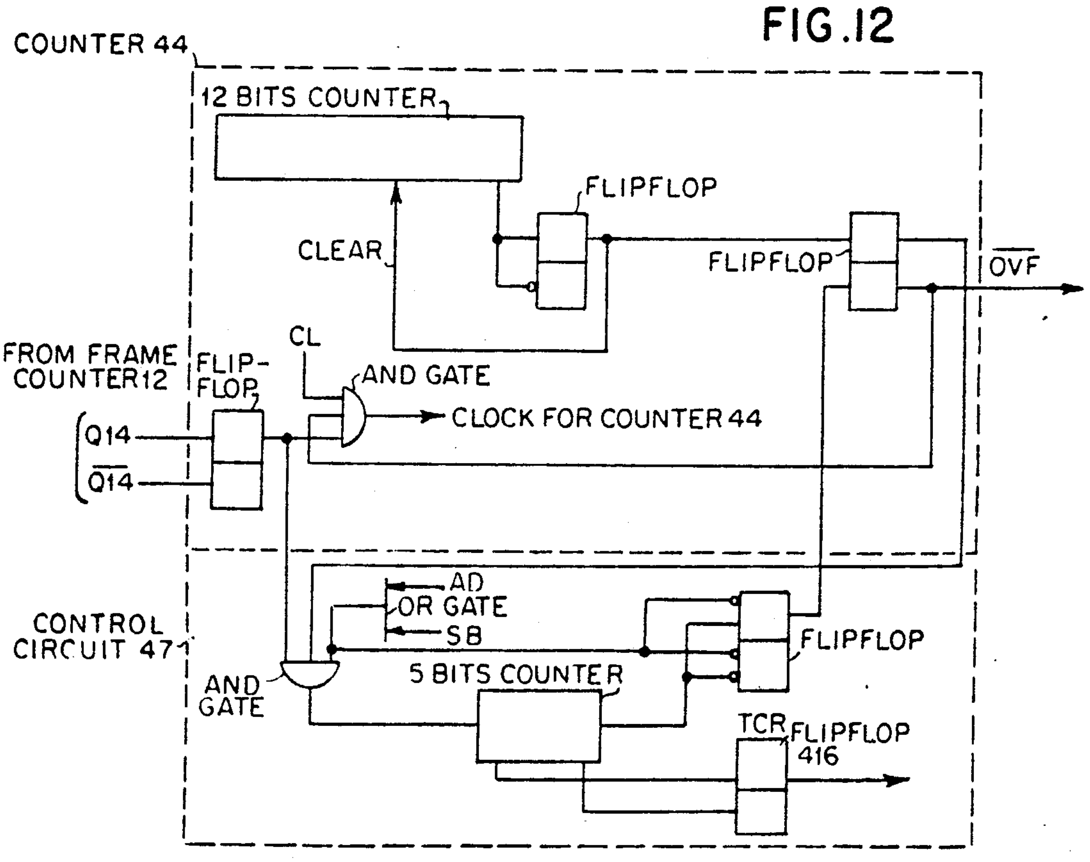
FIGS. 11 and 12 are circuit diagrams illustrating the details of the embodiment of FIG. 5.

FIG. 12 shows the details of the counter 44 and the control circuit 47 for counting the maximum time required for an electrical wave to go from the ground to the satellite and return from the satellite to the ground. Details of the 12 bit counter of the counter 44 are not shown herein, since such counter is also similar to the 13 bit counter of FIG. 6 in principle.

While the invention has been described by means of specific examples and in specific embodiments, we do not wish to be limited thereto, for obvious modifications will occur to those skilled in the art without departing from the spirit and scope of the invention.

We claim:

1. A communication network synchronization control system in a time division multiplex communication system, said communication system comprising a plurality of stations capable of communicating with each other by the transmission by each station of a burst containing a unique word pattern which discriminates said station, the plurality of stations transmitting a plurality of bursts provided at designated time positions within a frame said communication network synchronization control system comprising a memory for storing the reception forecast time instants for the bursts within a frame and the unique word patterns for the bursts, said reception forecast time instants corresponding to the unique word patterns;

a counter for counting the timing within a frame;

a reception timing circuit for providing time signals;

coincidence detection means coupling said counter to said reception timing circuit for actuating the reception timing circuit by determining coincidence between the count of said counter and the information of the reception forecast time instants stored in said memory;

a unique word detector having outputs and an input coupled to said reception timing circuit for determining coincidence between the unique word pattern of a received burst and the unique word pattern corresponding to the reception forecast time instant stored in said memory by the actuation of the reception timing circuit, said unique word detector being utilizable in common for a plurality of received bursts and producing a coincidence detection output upon coincidence; and correcting means coupled to the outputs of said unique word detector for determining a deviation between the time instant of reception of the burst and the reception forecast time instant from the coincidence detection output of the unique word detector and correcting the reception forecast time instant on the basis of the deviation.

2. A communication synchronization system of a time division multiple access communication system, said communication system transmitting a plurality of bursts in each frame and comprising a memory for storing a unique word pattern and a predicted receiving time for each burst in a frame;

a counter for counting the timing of a frame;

a receiving time circuit for providing timing signals;

coincidence detection means coupling said counter to said receiving time circuit for determining coincidence between the count of said counter and the predicted receiving time stored in said memory and for actuating said receiving time circuit when coincidence is detected;

a unique word register for storing the unique word pattern;

a unique word detector having outputs and an input coupled to said receiving time circuit via said unique word register for determining coincidence between the unique word pattern and the unique word pattern of a received burst, said unique word detector being initiated in operation by a signal from said receiving time circuit;

correcting means coupled to the outputs of said unique word detector for determining a deviation between the time of reception of the burst and the predicted receiving time and correcting said predicted receiving time in accordance with said deviation; and means coupled to said memory for reading out a unique word pattern stored in said memory and for shifting the read out unique word pattern at a constant rate, said unique word detector comparing said unique word pattern with the unique word pattern of the received burst at each shift position of said last-mentioned means and producing a coincidence detection output at a coincident shift position and said correcting means determining the phase difference between the predicted receiving time and the time of reception of the burst by the shift position which produces the coincidence detection output.

3. A communication synchronization system of a time division multiple access communication system, said communication system transmitting a plurality of bursts in each frame and comprising a memory for storing a unique word pattern and a predicted receiving time for each burst in a frame;

a counter for counting the timing of a frame;

a receiving time circuit for providing timing signals;

coincidence detection means coupling said counter to said receiving time circuit for determining coincidence between the count of said counter and the predicted receiving time stored in said memory and for actuating said receiving time circuit when coincidence is detected;

a unique word register for storing the unique word pattern;

a unique word detector having outputs and an input coupled to said receiving time circuit via said unique word register for determining coincidence between the unique word pattern and the unique word pattern of a received burst, said unique word detector being initiated in operation by a signal from said receiving time circuit;

correcting means coupled to the outputs of said unique word detector for determining a deviation between the time of reception of the burst and the predicted receiving time and correcting said predicted receiving time in accordance with said deviation, said correcting means storing the corrected predicted receiving time in the same area of said memory which stores the initial predicted receiving time;

first storage means for reading out from said memory the corrected predicted receiving time corrected with regard to a burst of a reference station of said communication system and storing the readout corrected predicted receiving time;

second storage means for reading out from said memory the corrected predicted receiving time corrected with regard to a burst of the station of said communication having said storage means and storing the readout corrected predicted receiving time;

calculating means connected to said first and second storage means for determining from the predicted receiving time the time difference between the burst of said reference station and the burst of said station having said storage means; and third storage means connected to said calculating means for storing the time difference determined by said calculating means, said calculating means determining deviation of the transmission phase from the difference of the stored contents of said first and second storage means and the stored contents of said third storage means and correcting the transmission time of the burst of said station having said storage means in accordance with said deviation.

4. A communication synchronization system of a time division multiple access communication system as claimed in claim 2, wherein said means for reading out a unique word pattern stored in said memory shifts the read out unique word pattern within an allowable receiving range for the predicted receiving time.

5. A communication synchronization system of a time division multiple access communication system as claimed in claim 2, wherein said means for reading out a unique word pattern stored in said memory shifts the readout unique word pattern bit by bit, said unique word detector compares said unique word pattern with the unique word pattern of the received burst at each shift position of said last-mentioned means bit by bit and produces a coincidence detection output at a coincident shift position at which the number of coincidences between said bits exceeds a predetermined number.

6. A communication synchronization system of a time division multiple access communication system as claimed in claim 3, further comprising a satellite station in said communication system, means for determining the maximum round trip radio wave propagation time to the satellite station of said communication system and means coupled to said calculating means and said last-mentioned means for preventing the correction of the next transmission phase during the period between the completion of the correction of the transmission phase and the end of the maximum round trip radio wave propagation to said satellite station.

7. A communication synchronization system of a time division multipie access communication system as claimed in claim 3, further comprising a ring counter connected to said calculating means for counting the number of bits in a frame, and wherein said calculating means transmits the burst of the station having said ring counter whenever said ring counter counts a predetermined number and corrects the transmission phase when said deviation is a positive value by halting the count up of said ring counter by one bit and when said deviation is a negative value by repeating the count up by said ring counter of bits the number of which is greater by one than that of the normal frame bits for each frame until said deviation is eliminated.

* * * * *